United States Patent [19]
Gross

[11] 4,439,021
[45] Mar. 27, 1984

[54] MOTOR VEHICLE REAR VIEWING SYSTEM

[76] Inventor: Leo Gross, 3611 217 St., Bayside, N.Y. 11361

[21] Appl. No.: 271,610

[22] Filed: Jun. 8, 1981

[51] Int. Cl.³ .............................................. G02B 3/08
[52] U.S. Cl. ................................................... 350/452
[58] Field of Search ....................................... 350/452

[56] References Cited

U.S. PATENT DOCUMENTS

| | | | |
|---|---|---|---|
| 2,953,961 | 9/1960 | Court | 350/452 |
| 4,220,400 | 9/1980 | Vizenor | 350/452 X |
| 4,274,714 | 6/1981 | Okamura | 350/452 |

*Primary Examiner*—John K. Corbin
*Assistant Examiner*—Scott J. Sugarman
*Attorney, Agent, or Firm*—Lackenbach, Siegel, Marzullo, Presta & Aronson

[57] ABSTRACT

One or more Fresnel prisms appropriately mounted integrally in the rear window (or windows) of a motor vehicle expands the drivers' field of view, eliminating blind spots both to the right and left rear areas of the vehicle. The viewing system, used in conjunction with an internally mounted rear viewing mirror, overcomes the necessity of providing either or both right and left side outboard rear viewing mirrors.

5 Claims, 8 Drawing Figures

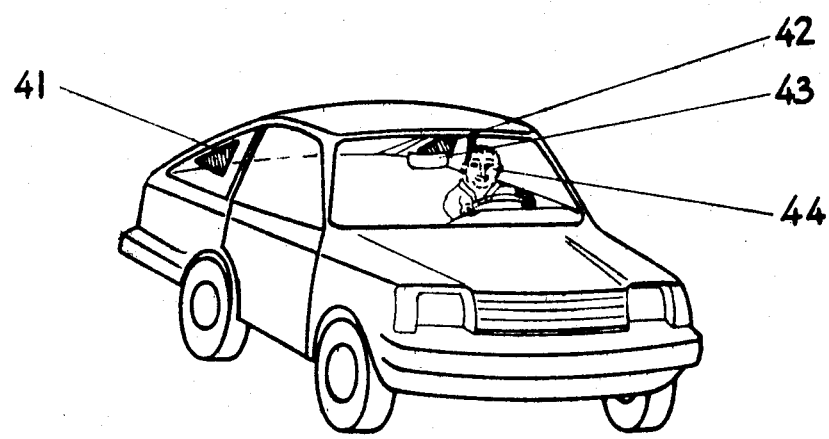
FIG. 5
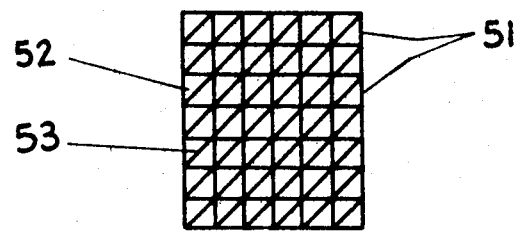
FIG. 6
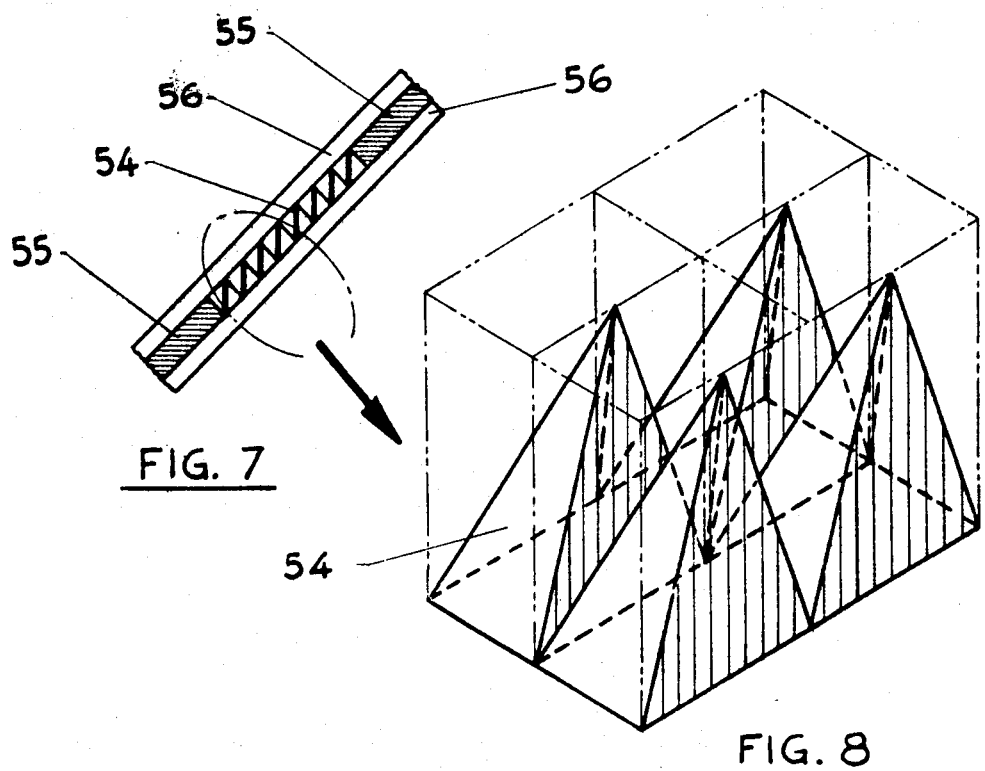
FIG. 7
FIG. 8

4,439,021

MOTOR VEHICLE REAR VIEWING SYSTEM

FIELD OF THE INVENTION

This invention relates to a rear viewing system for motor vehicles to see around the opaque portions of the motor vehicle that block the operator's view of the rear of the vehicle. This invention expands the field of view on either or both sides of the vehicle by inboard devices, eliminating the necessity of providing either or both customary outboard right and/or left side rear viewing mirrors.

DESCRIPTION OF THE PRIOR ART

Many inventions are recorded in the patent literature to provide an unobstructed view of the rear of the motor vehicle to the operator. A view to the rear of the vehicle that is obstructed by the opaque portions of the vehicle is made available to the driver by a multiplicity of mirrors, either or both left and right side outboard viewing mirrors. The driver then can see to the rear of the right and/or left sides, areas of vision restricted by doors, roof supports, and the body of the vehicle. The elimination of these blind spots blocking the driver's direct vision or view with the aid of an internally mounted rear view mirror has been the aim of many proposed devices.

U.S. Pat. No. 3,794,411 uses a series of broad prisms mounted in a special port in the roof of the vehicle, just above the driver. The prism directs light rays from the blind spots into the rear view mirror, enabling the operator to see these areas by a slight movement of his head. This solution adds the expense of an additional viewing port which must be sealed against the weather. This device requires extra installation and maintenance of additional optical surfaces.

Fresnel lenses and Fresnel prisms are utilized in U.S. Pat. Nos. 3,809,461, 3,809,462, and 3,826,562. Negative Fresnel lenses are included to expand the field of view by projecting a virtual image reduced to scale, while the Fresnel prism directs the viewer's vision to areas in the vehicle's blind spot. When used in combination, this compact optical device can be placed in any of several locations, inside or outside, the vehicle. In fact, one suggested location is a port above the driver as in U.S. Pat. No. 3,794,411. Outside locations require that this device be protected from dirt and debris; where it will be a barrier to the wind stream, decreasing the miles per gallon vehicle efficiency. When placed in an inside location, difficulties of using Fresnel lenses becomes an obstacle to widespread use. Most passenger vehicles have sloping rear windows. Where the Fresnel lenses are placed against the rear window, the driver would be presented with a view of the sky, since the a Fresnel lens forms its best image in the direction of its optic axis. This can be avoided by mounting the lense vertically, where the device must interfere with passengers headroom. Regulations for rear viewing devices are becoming increasingly strict. A problem created by expanding optical devices, as is a negative Fresnel lense, is that the operator requires considerable training to estimate distances in the compressed image.

Periscopes have been suggested many times but have not yet been adopted because of cost, maintenance of a complex optical system, and difficulties in estimating distance through a lense or series of lenses. U.S. Pat. Nos. 4,033,678, 3,827,788, 3,774,996, 3,773,406, 3,463,578 and 3,058,395, among others representative of various novel designs, utilize periscopes as rear viewing devices.

Automobile safety precautions require right side rear view mirrors. A mechanism will be required to adjust these mirrors from the left side driver's seat. The invention described herein will remove the necessity for the expensive coupling in the adjusting mechanism; it may well eliminate outboard viewing mirrors for many vehicles.

SUMMARY OF THE INVENTION

The object of the present invention is to provide a rear viewing system for a motor vehicle which will be inexpensive, simple in design and construction, and require a minimum number of adjustments.

The device consists of one or more Fresnel type prisms placed in one or more rear windows of a motor vehicle. The Fresnel prisms, integral parts of the windows, deflect rays of light from the blind spots to the rear of the vehicle onto the conventional rear view mirror positioned in the vehicle mid-line in front of the driver. The driver can then clearly see what formerly were blind spots by slight movements of head and/or eye to see the appropriate area of said rear window.

A rear viewing device that is a part of the rear window and is properly positioned when the window is installed in the vehicle. No adjustments are required; by design, the Fresnel device is specifically adapted to the specific vehicle's blind spots.

This rear viewing device has advantages that:

(1) Wind resistance of outboard right and left side rear viewing mirrors is eliminated by these inboard rear viewing devices, a welcome feature which increases mileage per gallon.
(2) No adjustments are required. The rear viewing devices are positioned to cover blind spots during window installation.
(3) The combined cost of window plus integral rear viewing device(s) is less expensive than the customary window plus outboard rear viewing mirror(s).
(4) The rear viewing device does not occupy any volume within the passenger compartment of the vehicle.
(5) The rear viewing device cannot be fogged or muddied since it is cleaned and maintained by existing equipment—defrosters and wipers. As a consequence, the rear viewing devices described in this invention are available for unobstructed use in inclement weather.
(6) The Fresnel type prisms which are the central elements of this device do not distort distance estimates, since the image is unchanged in dimensions, is of the same relative size as other views seen in the rear view mirror.

Another object of the present invention is to provide a rear viewing system specifically preset to enable the vehicle operator to view the areas about the rear of the vehicle blocked from vision by the opaque structures of the vehicle.

A Fresnel prism is a series of miniature prisms in a flat plate that performs in all respects as a single prism of larger dimensions of triangular cross-section. The angle of deflection of the image from the Fresnel prism is dependent on the included angle of each prism section in the Fresnel structure, and on the orientation of the prism towards the blind areas behind the vehicle. The internal rear view mirror reveals the former blind spots to the vehicle's operator. The Fresnel prism or prisms is an integral part of the rear window and oriented to allow for both the slope of the window and the area to the right and left rear of the vehicle, formerly blind spots, into the operator's vision.

Another object of the invention is to mate a specific Fresnel prism to each vehicle's construction in a manner requiring no adjustment of the rear viewing device. This is accomplished by placing the flat Fresnel prism between the laminations of the safety glass of which the window is constructed. A Fresnel prism (or prisms) of the appropriate power and at the required angle occupies a limited area of the rear window and provides an unobstructed view of the left (and right) formerly blind spots behind the vehicle.

BRIEF DESCRIPTION OF THE DRAWINGS

FIG. 5 is an elevational view showing mounting of the prism in a side window of a vehicle.

FIG. 6 is a plan view of a Fresnel prism for a sloping window.

FIG. 7 is a cross-sectional view of a Fresnel prism for a sloping window assembly where FIG. 8 shows enlarged perspective detail view of the individual prism segments.

DESCRIPTION OF THE INVENTION

The action of a prism, an optical element of triangular cross-section, changes the direction of propagation of a light beam and therefore the orientation of an image. It is this property that is applied in this invention. The bulk of the prism does not contribute to its function of bending the light beam. The greater the apex angle between the optical surfaces which reflect the light rays, the greater is the magnitude or power of the prism to deflect the image. When the bulk of the optical media, the glass or plastic, is dispensed with, what is left is a series of minute slivers of triangular cross-section, part of a flat plate, called a Fresnel prism. (See FIG. 1, seen in cross-section in region A—A.)

In the embodiment in this invention, this Fresnel prism, 1, is molded from clear plastic and placed between the two laminations of the safety glass, 2, from which the window is constructed. The adhesive bonding 3, the glass panes is of the same thickness as the Fresnel prism. To preserve the deflecting power of the prism, no adhesive must be allowed to flow into or occupy triangular grooves 4 between the prism sections.

Figure 2:
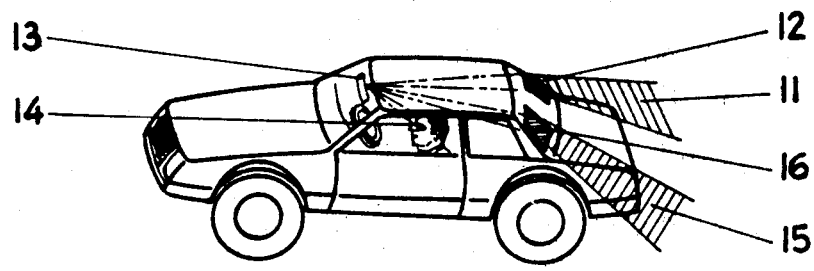
FIG. 2 is a representation showing the field of view of a Fresnel prism.

The Fresnel prism window assembly directs light reflected from objects to the rear and side of the vehicle (in the blind spots) to the internal, centrally located rear view mirror in front of the driver. By shifting his direction of vision in the rear view mirror slightly, the vehicle operator can look towards the appropriate region of the rear window. In FIG. 2, the fields of view available to the driver of a vehicle are schematically illustrated. Light rays from region 11, the right side blind spot, are refracted by the Fresnel mirror, 12, in the rear window assembly and thence to the centrally located rear view mirror, 13, which is standard automobile equipment. From there, the image of the right side blind spot is reflected to the driver, 14. The left side blind spot 15 can be brought into view by the Fresnel mirror 16 which is part of the rear window assembly, which deflects the image similarly to the rear view mirror 13, from whence it is reflected to the eyes of the driver, 14.

Figure 3:
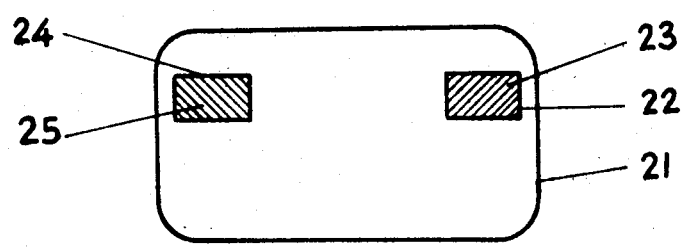
FIG. 3 is a schematic view demonstrating the operation of a Fresnel prism rear window assembly according to the invention to bring blocked areas into view from the driver's seat.

The operation of the rear window Fresnel prism assembly can be seen more clearly in the drawing of the prisms as located in the view from the back of the vehicle looking forward through the rear window, 21 in FIG. 3. The prism 22, which provides a view of the right side blind spot, is mounted in the upper right hand corner of the window to provide a view of the region directly to the side and just behind the vehicle unobstructed by the structures of the vehicle.

In many vehicles the rear window is sloped to conform with the streamlining of the automobile body. A Fresnel prism mounted in the rear window has its action modified by this slope. To maximize the image deflection effect of the Fresnel prism and to bring the desired areas behind the vehicle's blind spot into view, the direction of the Fresnel prism elements, 23, is tilted. In a similar manner, the prism, 24, which brings the left side rear blind spot into the driver's view, is placed in the upper left hand corner of the rear window, with its prism elements, 25, oriented at the appropriate slant to optimize the view of the blind spot.

Figure 4:
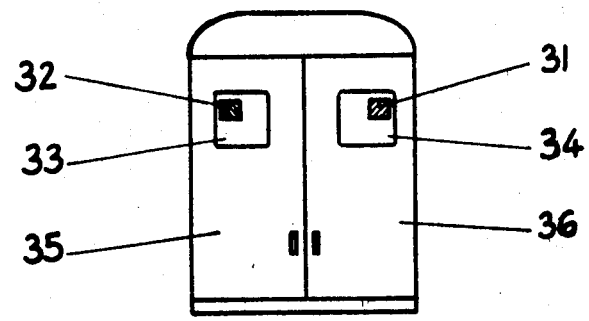
FIG. 4 is a sketch of a Fresnel prism window assembly according to the invention in the windows of a panel truck.

FIG. 4 shows a van or truck type vehicle where the Fresnel prisms 31, 32, are mounted in the windows on the rear doors 35, 36.

The use of Fresnel prisms in window assemblies can be extended to the side windows. The blind areas on the right side of the vehicle can be seen more fully with the aid of a Fresnel prism mounted in the right side rear window as shown in FIG. 5, whereby the image of the blind area, 41, is deflected by the prism, 42, towards the rear viewing mirror, 43, so the driver, 44, can observe the image by shifting his vision in said rear view mirror.

When the rear window of the vehicle is markedly sloped, the effective angle of the Fresnel prism in the direction of vision is correspondingly reduced. The power of the Fresnel prism in the desired direction can be maintained by further dividing each vertical section of the prism into smaller elements. Each of the elements is oriented vertically as shown in FIG. 6. The Fresnel plate 53 is then composed of a series of prism slices 51 wherein each slice is divided into prism elements 52, each element being oriented vertically to compensate for the slope of the rear window. The individual elements 52 (FIG. 7) are shown in a schematic of a sloping window wherein the refracting edge 54 of the prism element is vertical where the prism array is held between panes of safety glass 56 cemented together with adhesive 55. Visualization of the prism element array is clarified by the perspective view of a portion of the Fresnel prism, shown in FIG. 8.

Figure 1:
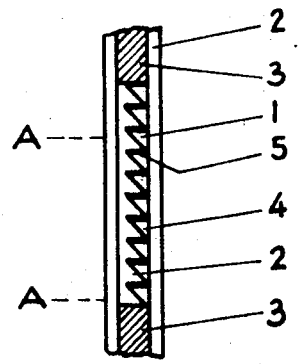
FIG. 1 is a cross-sectional view of the assembly of the Fresnel prism in this invention.

Light rays which enter the prism and then exit through another face are both deflected and dispersed or spread into a spectrum of colors. For prisms used in this manner, colored images are observed. In the application of Fresnel prisms to viewing vehicle blind spots, colored images are undesirable, since they may obscure image details and lead to imprecise estimation of object location. In this invention, the Fresnel prisms can be used as reflecting prisms, where one internal reflection occurs before the light rays exit from the prism and proceeds on its path to the viewer. An internal reflection reverses the prism's dispersive action and the image of the incident rays emerges without coloration, the prism being achromatic. In the usage of Fresnel prisms in this invention, the internal reflection is enhanced by placing a reflecting coating on one of the two faces of each prism element as shown by the heavier line, 5, on each prism element, 4. (FIG. 1)

The Fresnel prism is located in the window assembly at a height sufficient to provide a direct path for the light rays from the blind area to reach the window, unobstructed by any projection of the body structure of the vehicle. The Fresnel prism is placed high on the window to be clear of the heads of passengers occupying seats between the prism and the viewing mirror in front of the driver. Both these conditions are met for a prism mounted in the upper corners of the rear window. The deflecting ability of the prism depends on the prism angle and the incident angle of the light ray. Increasing the prism angle, increases the power of the prism, measured in diopters, where one prism diopter is the deflection of the image by 1 cm at a distance of one meter. The power of the prism and the orientation of the prism elements to the vertical to bring the blind areas into view is adjusted for the location of the blind areas with respect to the window. Adjustment varies with the location of the blind areas and vehicle model, and the slope of the rear windows for that particular model vehicle. For the majority of passenger vehicles, a 5Δ (5 prism diopters) prism properly sloped will be satisfactory.

The foregoing discussion described the Fresnel assembly as an integral part of the rear window.

Fresnel prisms can also be affixed to existing rear windows as a retrofit device.

The use of Fresnel prism assemblies as described allows for the elimination of side view mirrors for which the prisms substitute, and the adjustment devices within the vehicle which require additional expense. All outboard mirrors detract from vehicle streamlining which occasions the use of additional fuel to overcome air resistance. The use of Fresnel prism assemblies integral with safety glass windows as rear viewing devices minimizes cost.

The invention described in the text is new and novel and I claim:

1. In an improved optical system for directing an image from blind spots at the rear of a vehicle to the operator's view, the improvement comprising in combination with a rear window of said vehicle a laminated integral Fresnel window assembly having a plurality of Fresnel prism elements mounted integrally with the refracting edge of each said prism elements oriented vertically between laminate layers of said window of said vehicle so as to compensate for the slope of a markedly sloping rear window; wherein the power and orientation of said prism elements are selected to fit the window location and the direction of each said prism element is tilted and oriented to optimize the view of the blind spots to a vehicle operator when used in conjunction with a centrally mounted rear viewing mirror; and whereby side view mirrors may be eliminated from said vehicle.

2. The improvement according to claim 1, with two or more Fresnel assemblies to direct images from two or more blind spots at the rear of said vehicle.

3. The improvement according to claim 1, with one set of faces of said Fresnel prism elements being coated for internal reflection.

4. The improvement according to claim 1, wherein a Fresnel window assembly is mounted in the upper corners of said rear window so as to clear the heads of passengers occupying seats between the said window assembly and the rear viewing mirror in front of the driver.

5. The improvement according to claim 1, wherein as the prism angle increases, the power of the prism is increased, and a five-diopter prism is satisfactory for most car models regardless of the location of the blind spots and the slope of the rear window.

* * * * *